(12) United States Patent
Langenfeld et al.

(10) Patent No.: US 10,981,636 B1
(45) Date of Patent: Apr. 20, 2021

(54) MARINE ENGINES HAVING A SUPERCHARGER

(71) Applicant: Brunswick Corporation, Mettawa, IL (US)

(72) Inventors: Gregg D. Langenfeld, Fond du Lac, WI (US); Jinesh Arakkal Meethal, Fond du Lac, WI (US); Christopher R. Jenks, Rosendale, WI (US)

(73) Assignee: Brunswick Corporation, Mettawa, IL (US)

( * ) Notice: Subject to any disclaimer, the term of this patent is extended or adjusted under 35 U.S.C. 154(b) by 33 days.

(21) Appl. No.: 16/514,531

(22) Filed: Jul. 17, 2019

(51) Int. Cl.
*B63H 20/00* (2006.01)
*F01M 3/00* (2006.01)
*F02D 41/00* (2006.01)
*F02B 29/04* (2006.01)

(52) U.S. Cl.
CPC .............. *B63H 20/002* (2013.01); *F01M 3/00* (2013.01); *F02B 29/0406* (2013.01); *F02D 41/0007* (2013.01)

(58) Field of Classification Search
CPC ........ B63H 20/002; B63H 20/00; F01M 3/00; F02B 29/0406; F02D 41/0007
See application file for complete search history.

(56) References Cited

U.S. PATENT DOCUMENTS

| | | |
|---|---|---|
| 2,306,554 A | 12/1942 | Morchouse |
| 2,551,307 A * | 5/1951 | Yingling ................. F02B 37/04 60/609 |
| 3,636,911 A | 1/1972 | Piazza |
| 3,877,447 A * | 4/1975 | Ross, Sr. ................. F02B 47/08 60/278 |
| 4,117,907 A | 10/1978 | Lechler |
| D276,811 S | 12/1984 | Wolfe |
| 4,496,326 A | 1/1985 | Boda |
| 4,521,201 A | 6/1985 | Watanabe |
| 4,582,493 A | 4/1986 | Toyohara |
| 4,650,429 A | 3/1987 | Boda |
| 4,701,141 A | 10/1987 | Sumigawa |
| 4,716,735 A * | 1/1988 | Ruf ......................... F01D 25/24 180/291 |
| D295,867 S | 5/1988 | Walsh |
| 4,878,468 A | 11/1989 | Boda et al. |
| 4,964,378 A | 10/1990 | Tamba |
| 5,143,028 A * | 9/1992 | Takahashi ............... F02B 75/02 123/65 BA |
| 5,145,427 A | 9/1992 | Kawai |

(Continued)

FOREIGN PATENT DOCUMENTS

EP 3225809 4/2017

*Primary Examiner* — Stephen P Avila
(74) *Attorney, Agent, or Firm* — Andrus Intellectual Property Law, LLP

(57) ABSTRACT

A marine engine comprises a powerhead having an engine block, a cylinder head and a crankcase containing a crankshaft. Operation of the marine engine causes rotation of the crankshaft. A crankcase cover encloses the crankshaft in the crankcase. A supercharger is on the crankcase cover, the supercharger being configured to provide charge air for combustion in the powerhead. The supercharger comprises a charge air outlet for conveying charge air from the supercharger for combustion in the powerhead, the charge air outlet being oriented so as to discharge the charge air towards the powerhead.

19 Claims, 13 Drawing Sheets

(56) References Cited

U.S. PATENT DOCUMENTS

| | | |
|---|---|---|
| 5,261,356 A | 11/1993 | Takahashi |
| 5,340,342 A | 8/1994 | Boda et al. |
| 5,632,657 A | 5/1997 | Henderson |
| D380,478 S | 7/1997 | Robbins |
| 5,911,610 A | 6/1999 | Fujimoto |
| 6,010,563 A | 1/2000 | Taketani |
| 6,020,563 A | 2/2000 | Risk, Jr. |
| 6,093,066 A | 7/2000 | Isogawa |
| 6,146,221 A | 11/2000 | Natsume |
| 6,264,516 B1 | 7/2001 | McEathron et al. |
| 6,405,692 B1 | 6/2002 | Christiansen |
| 6,406,342 B1 | 6/2002 | Walczak et al. |
| 6,408,832 B1 | 6/2002 | Christiansen |
| 6,446,592 B1 | 9/2002 | Wilksch |
| 6,676,464 B2 | 1/2004 | Gokan et al. |
| 6,688,928 B2 | 2/2004 | Gokan et al. |
| 6,783,412 B1 | 8/2004 | Wynveen et al. |
| 6,821,171 B1 | 11/2004 | Wynveen et al. |
| 6,902,450 B2 | 6/2005 | Ohtsuki |
| 7,082,932 B1 | 8/2006 | Crane |
| 7,090,551 B1 | 8/2006 | Lokken et al. |
| D527,737 S | 9/2006 | Iekura |
| 7,100,584 B1 | 9/2006 | Bruestle et al. |
| 7,214,113 B2 | 5/2007 | Kojima |
| D552,129 S | 10/2007 | Steinberg |
| 7,318,396 B1 | 1/2008 | Belter et al. |
| 7,455,558 B2 | 11/2008 | Yander |
| 7,458,868 B2 * | 12/2008 | Mineo ............... F01P 3/207 440/88 C |
| 7,806,110 B1 | 1/2010 | Broman et al. |
| D611,501 S | 3/2010 | Vignau et al. |
| D611,502 S | 3/2010 | Vignau et al. |
| 7,677,938 B2 | 3/2010 | Wiatrowski et al. |
| 7,704,110 B2 | 4/2010 | Wiatrowski et al. |
| 7,895,959 B1 | 3/2011 | Angel et al. |
| D655,308 S | 3/2012 | Steinberg |
| 8,257,122 B1 | 9/2012 | Holley |
| 8,479,691 B1 | 7/2013 | Taylor et al. |
| 8,651,906 B1 | 2/2014 | Morton |
| 9,057,314 B1 | 6/2015 | Eichinger et al. |
| 9,086,009 B2 | 7/2015 | Mikame et al. |
| 9,359,058 B1 | 6/2016 | Langenfeld et al. |
| 9,365,274 B1 | 6/2016 | George et al. |
| 9,403,588 B1 | 8/2016 | George et al. |
| 9,422,045 B2 | 8/2016 | Kinpara |
| 9,616,987 B1 | 4/2017 | Langenfeld et al. |
| 9,650,937 B1 | 5/2017 | George et al. |
| 9,903,251 B1 | 2/2018 | Belter et al. |
| 10,047,661 B1 | 4/2018 | Torgerud |
| D834,618 S | 11/2018 | Zin et al. |
| 10,150,548 B2 | 12/2018 | Ochiai et al. |
| 10,202,888 B2 | 2/2019 | Wicks |
| 10,233,818 B1 | 3/2019 | Reichardt et al. |
| 10,293,901 B1 | 5/2019 | Sitton |
| 10,336,428 B1 | 7/2019 | Novak et al. |
| 2001/0039908 A1 | 11/2001 | Bilek |
| 2004/0137806 A1 | 7/2004 | Ohtsuki |
| 2009/0320772 A1 | 12/2009 | Hirose |
| 2010/0132355 A1 | 6/2010 | Michels et al. |
| 2017/0032826 A1 | 2/2017 | Li et al. |
| 2017/0328265 A1 | 11/2017 | George et al. |

\* cited by examiner

MARINE ENGINES HAVING A SUPERCHARGER

FIELD

The present disclosure generally relates to marine engines having a supercharger, for example marine engines for outboard motors.

BACKGROUND

The following U.S. Patents are incorporated herein by reference in entirety:

U.S. Design Pat. No. D834,618 discloses a cowl for a marine engine having port and starboard air intake ports.

U.S. Pat. No. 9,616,987 discloses a marine engine having a cylinder block having first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 8,651,906 discloses an apparatus for intake of air to an outboard motor including an inlet receiving a mixture of air and water from atmosphere surrounding the outboard motor and an outlet discharging the air. A conduit extends between the inlet and the outlet. The conduit has a vertically downwardly oriented first flow path, a vertically upwardly oriented second flow path, and a junction joining the first and second flow paths. The junction is oriented with respect to the first and second flow paths such that both centrifugal and gravitational forces separate the water from the air as the mixture flows there through.

U.S. Pat. No. 7,806,110 discloses a marine propulsion device provided with a turbocharger that is located above all, or at least a majority of, the cylinders of an engine. The exhaust gases are directed to one side of the engine and the compressed air is directed to an opposite side of the engine. The turbocharger is located at a rear portion of the engine behind the crankshaft.

U.S. Pat. No. 7,100,584 discloses an engine control system that determines a desired temperature range of air flowing into an intake manifold of the engine as a function of an operating characteristic, such as the load on the engine or the operating speed of the engine. A bypass conduit is provided in parallel with a heat exchanger, wherein both the bypass conduit and the heat exchanger are connected to an outlet of a compressor to direct air from the compressor to an intake manifold along the parallel paths. By manipulating an air valve in the bypass conduit, an engine control unit can regulate the temperature at an inlet of the intake manifold. A desired temperature is selected from a matrix of stored values as a function of the load on the engine and the engine operating speed.

U.S. Pat. No. 7,082,932 discloses a method in which a marine propulsion system with a charge air compressor is controlled through the use of a clutch or a multiple speed transmission that allows the charge air compressor to be engaged or disengaged. The engagement or disengagement of the charge air compressor can be a dual function of the demand for a change in torque and the engine speed.

U.S. Pat. Nos. 6,408,832 and 6,405,692 disclose an outboard motor with an engine having a screw compressor which provides a pressurized charge for the combustion chambers of the engine. The screw compression has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and the inlet of the compressor. The charge air cooler improves the operating efficiency of the engine and avoids overheating the air as it passes through the supercharger after flowing through the bypass conduit. The bypass valve is controlled by an engine control module in order to improve power output from the engine at low engine speeds while avoiding any violation of existing limits on the power of the engine at higher engine speeds.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter. In certain examples disclosed herein, a marine engine has a powerhead having an engine block, a cylinder head and a crankcase containing a crankshaft. Operation of the marine engine causes rotation of the crankshaft. A crankcase cover encloses the crankshaft in the crankcase. A supercharger is on the crankcase cover, the supercharger being configured to provide charge air for combustion in the powerhead. A cooling passage conveys cooling fluid between the crankcase cover and the supercharger so that the cooling fluid cools both the crankcase and the supercharger. The supercharger has a charge air outlet for conveying charge air from the supercharger for combustion in the powerhead, the charge air outlet being oriented so as to discharge the charge air towards the powerhead. A drainage port drains lubricant from the supercharger to the crankcase.

BRIEF DESCRIPTION OF THE DRAWINGS

Examples of marine engines having a supercharger are described with reference to the following drawing figures. The same numbers are used throughout to reference like features and components.

DETAILED DESCRIPTION OF THE DRAWINGS

Figure 3:
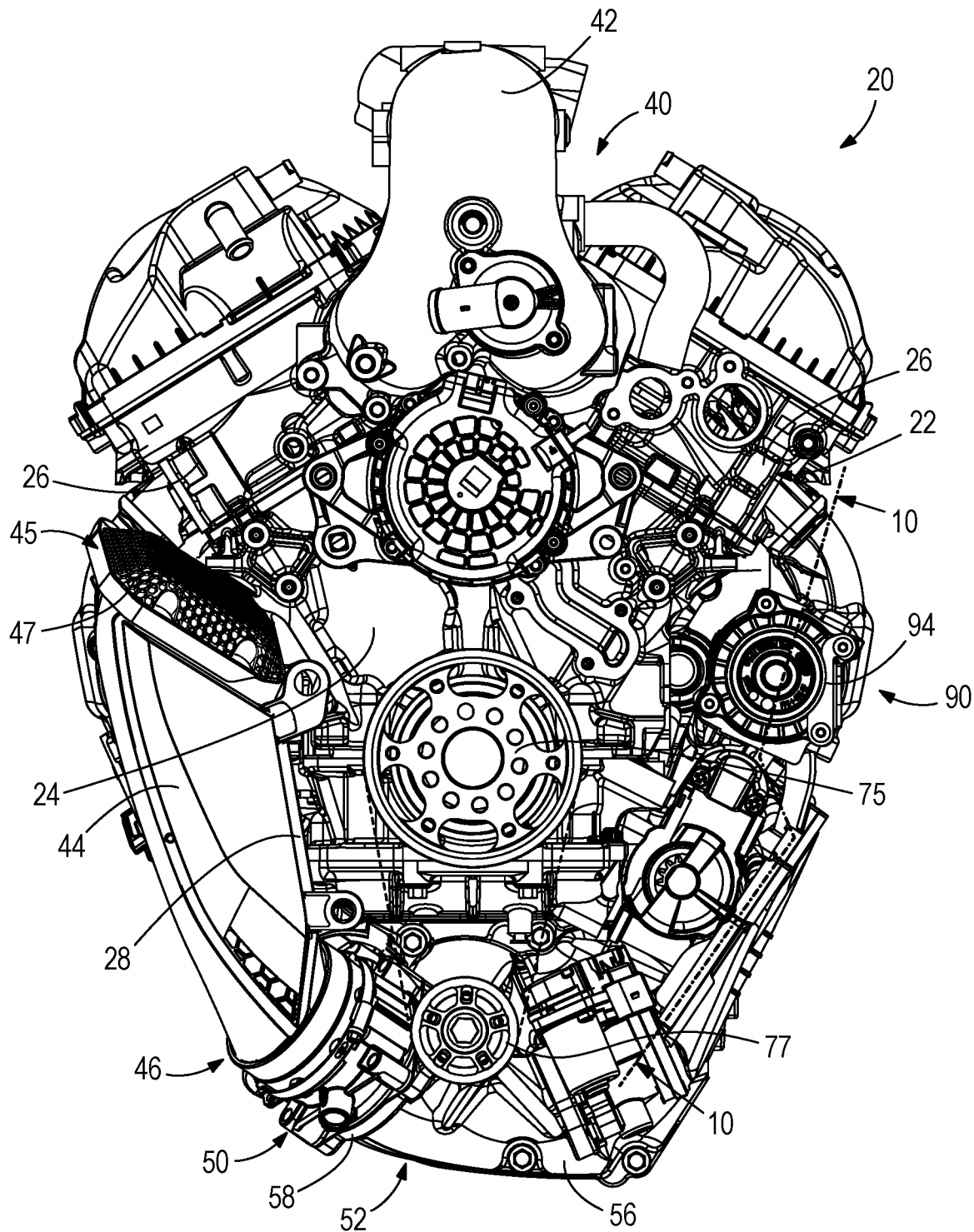
FIG. 3 is a top view of the marine engine.
Figure 4:
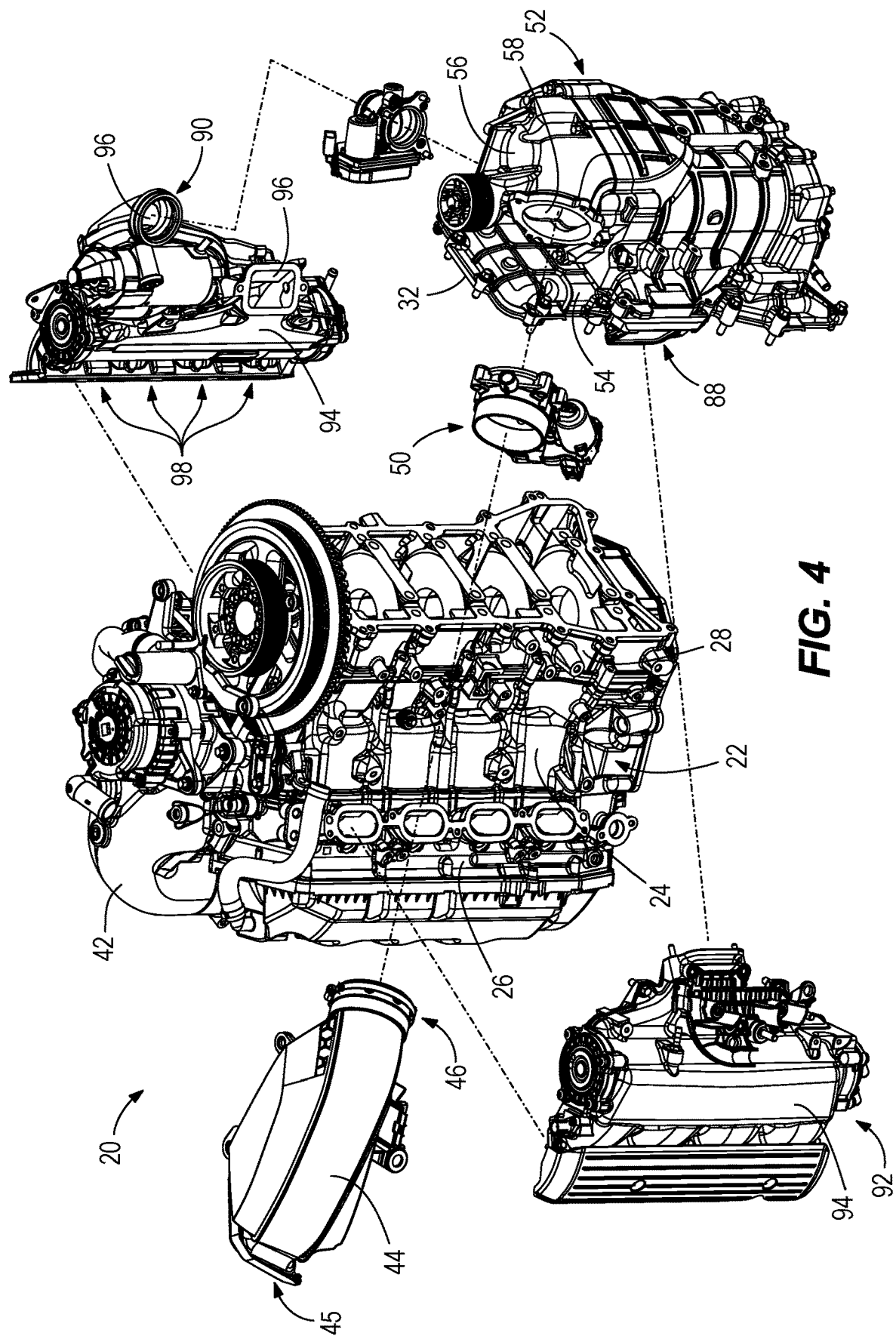
FIG. 4 is starboard side front perspective and exploded view of the marine engine.
Figure 5:
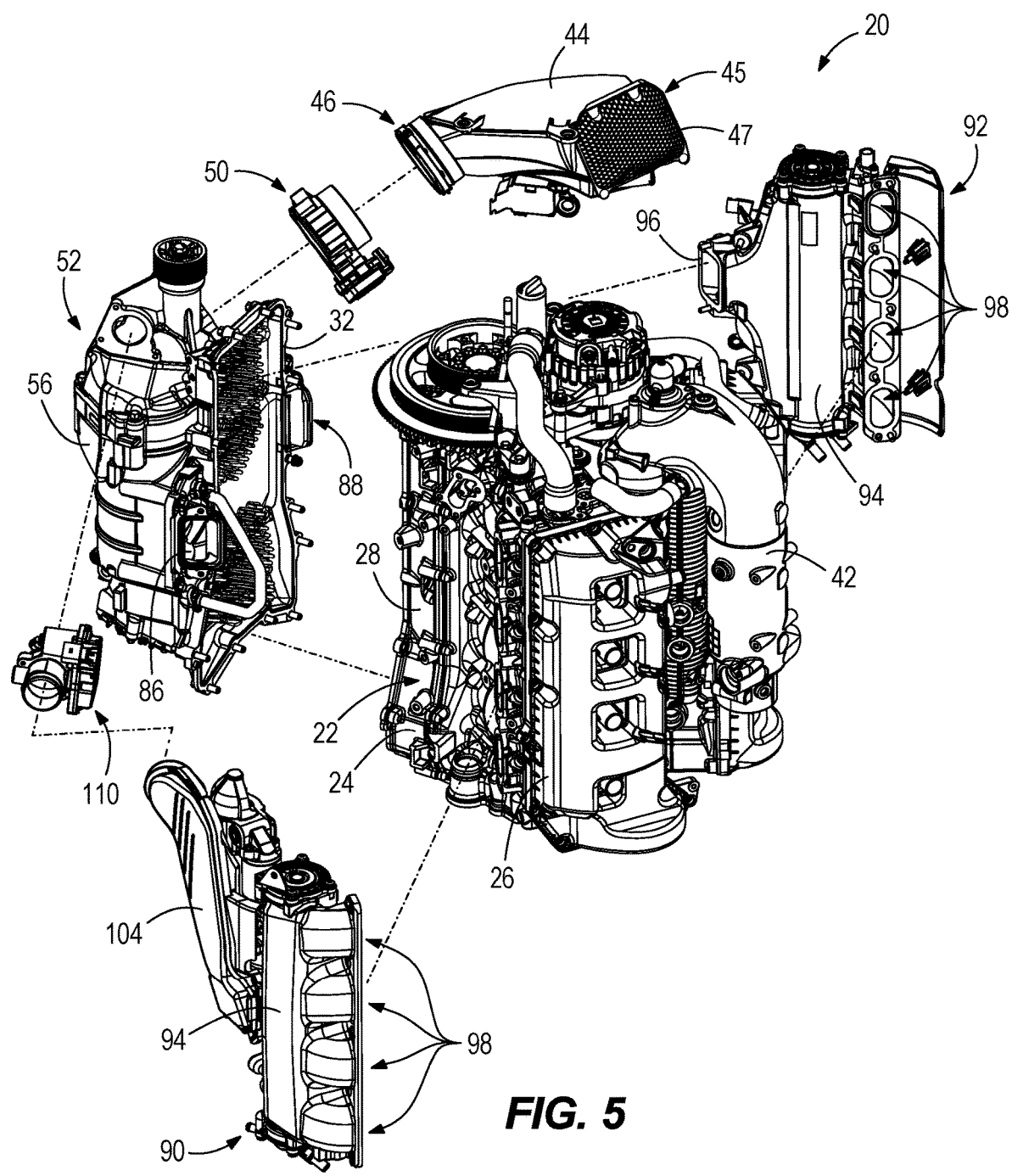
FIG. 5 is a port side rear perspective and exploded view of the marine engine.
Figure 6:
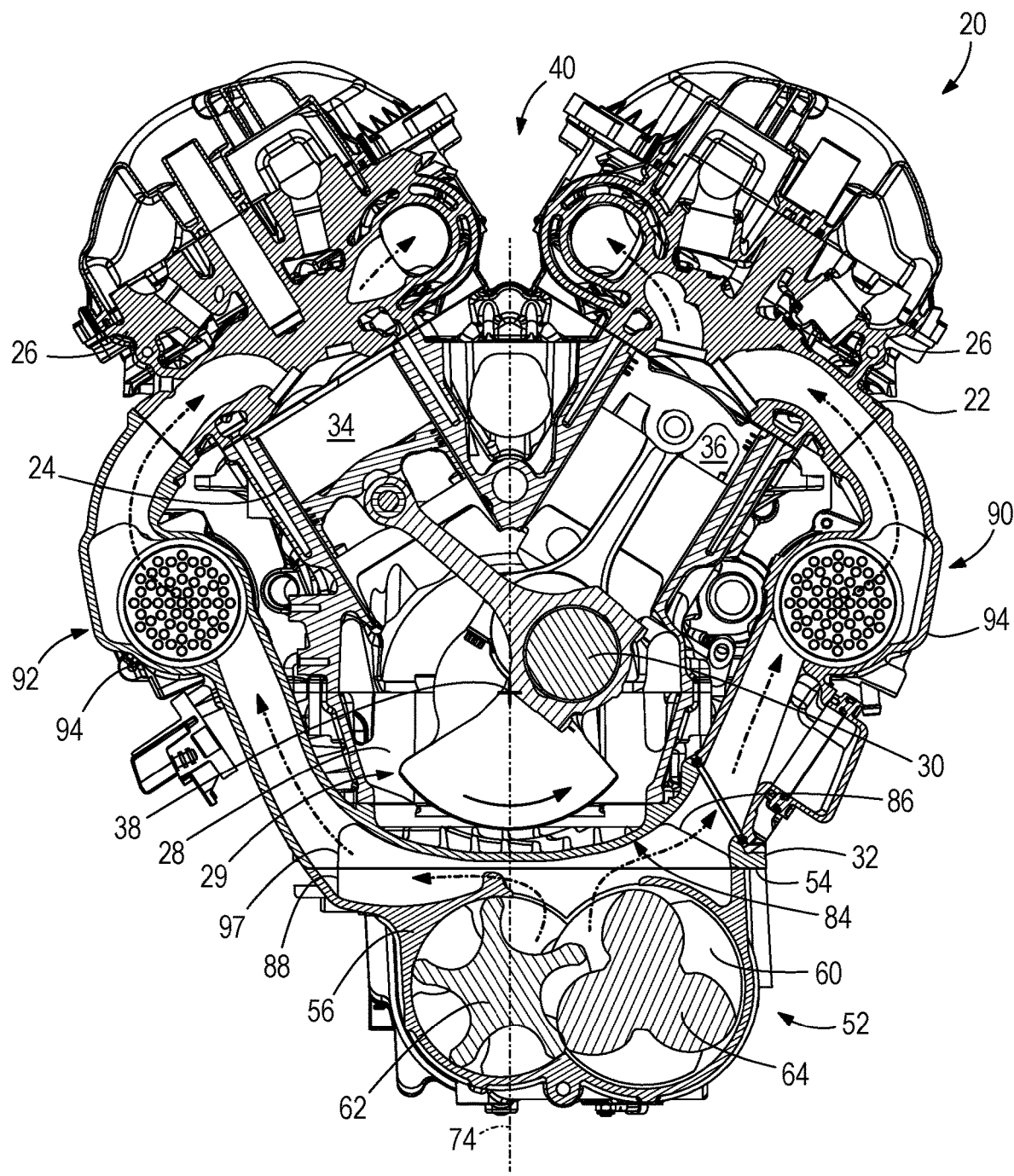
FIG. 6 is a view of Section 6-6, shown in FIG. 1.
Figure 12:
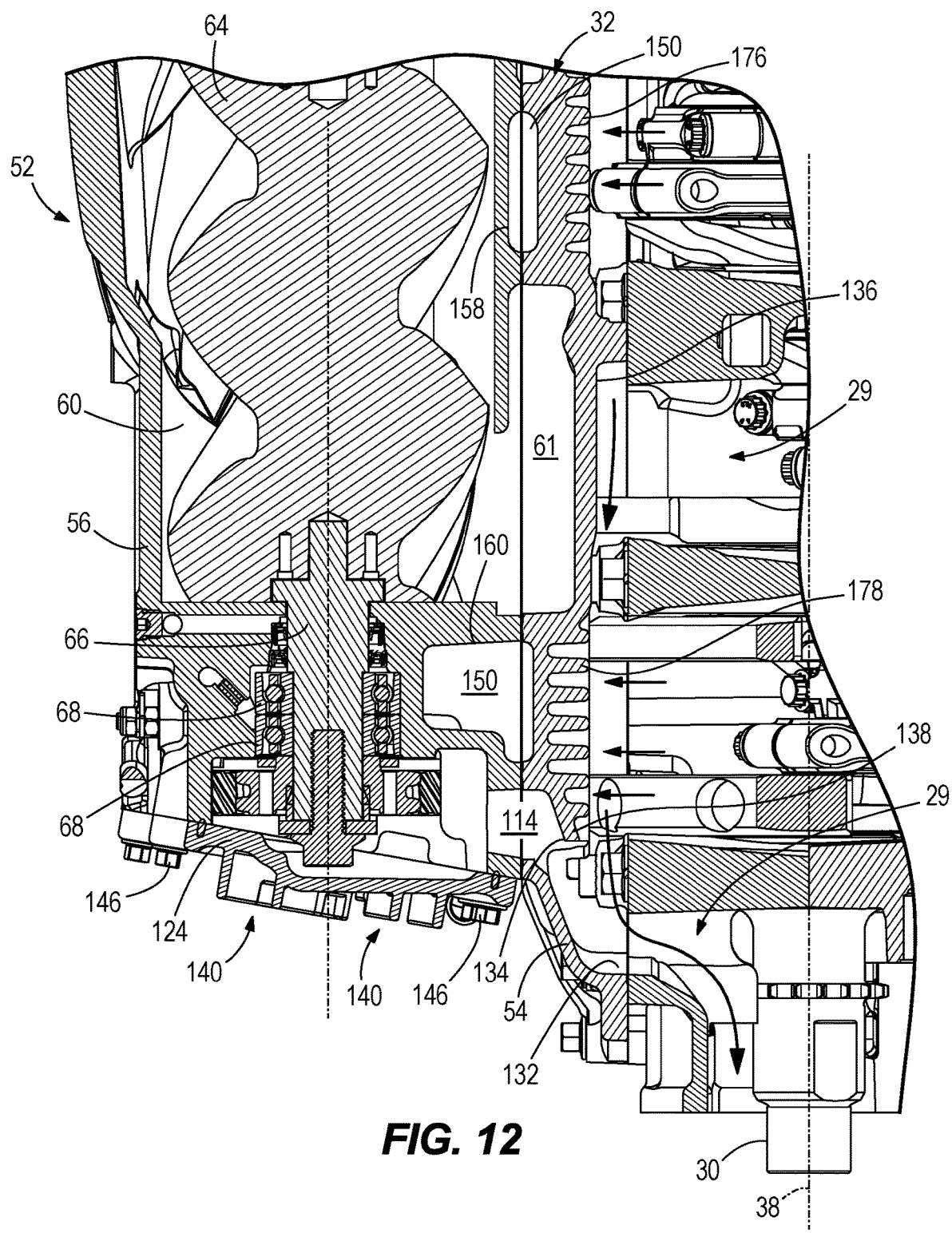
FIG. 12 is a view of Section 12-12, shown in FIG. 11.

FIGS. 1-6 depict a marine engine 20 for use in an outboard motor. The marine engine 20 includes a powerhead 22 consisting of an engine block 24, cylinder heads 26 and a crankcase 28 having a crankcase cavity 29 containing a crankshaft 30 (which is shown in FIGS. 6 and 12). Referring to FIGS. 4-6, a crankcase cover 32 encloses the crankshaft 30 in the crankcase 28. Similar to what is disclosed in the above-incorporated U.S. Pat. No. 9,616,987, the engine block 24 has first and second banks of cylinders 34, 36 (see FIG. 6) that are disposed along a longitudinal crankshaft axis 38 (see FIG. 12). The first and second banks of cylinders 34, 36 extend transversely with respect to each other in a V-shape so as to define a valley 40 there between (see FIGS. 3 and 6). An exhaust conduit 42 conveys exhaust gas from the marine engine 20 for discharge to atmosphere. The exhaust conduit 42 (see FIGS. 1-5) is centrally located in the valley 40 and receives the exhaust gas from the first and second banks of cylinders 34, 36 via the cylinder heads 26. The exhaust conduit 42 first conveys the exhaust gas upwardly relative to the crankshaft axis 38, reverses direction, and then conveys the exhaust gas downwardly relative to the crankshaft axis 38. As is conventional, the combustion process in the marine engine 20 causes rotation of the crankshaft 30, which in turn causes rotation of a corresponding driveshaft, propeller shaft, and propeller configured to propel a marine vessel in water. The above-incorporated U.S. Pat. No. 9,616,987 discloses this type of arrangement in more detail.

Figure 1:
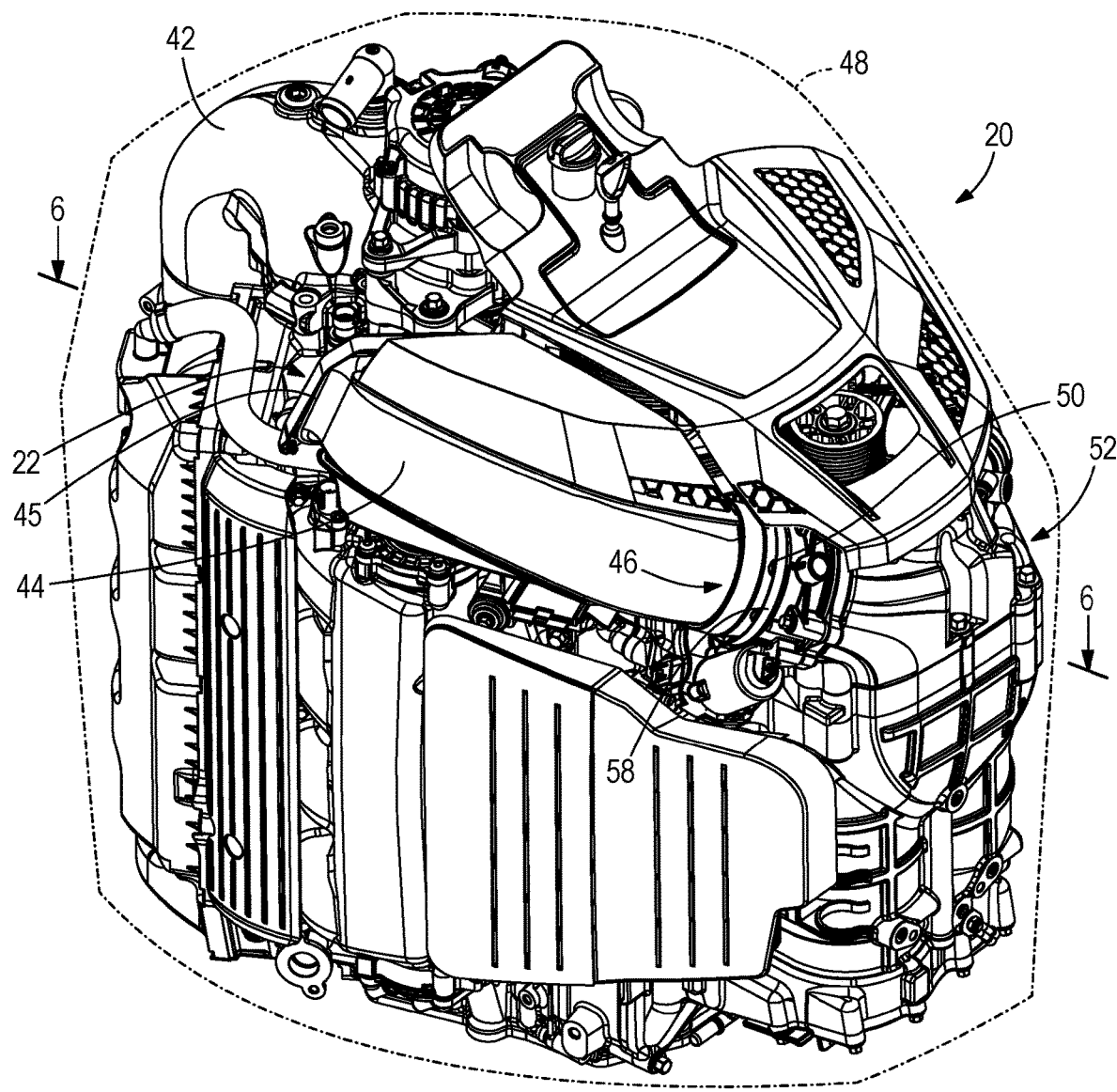
FIG. 1 is a starboard side front perspective view of a marine engine for propelling a marine vessel in water.
Figure 2:
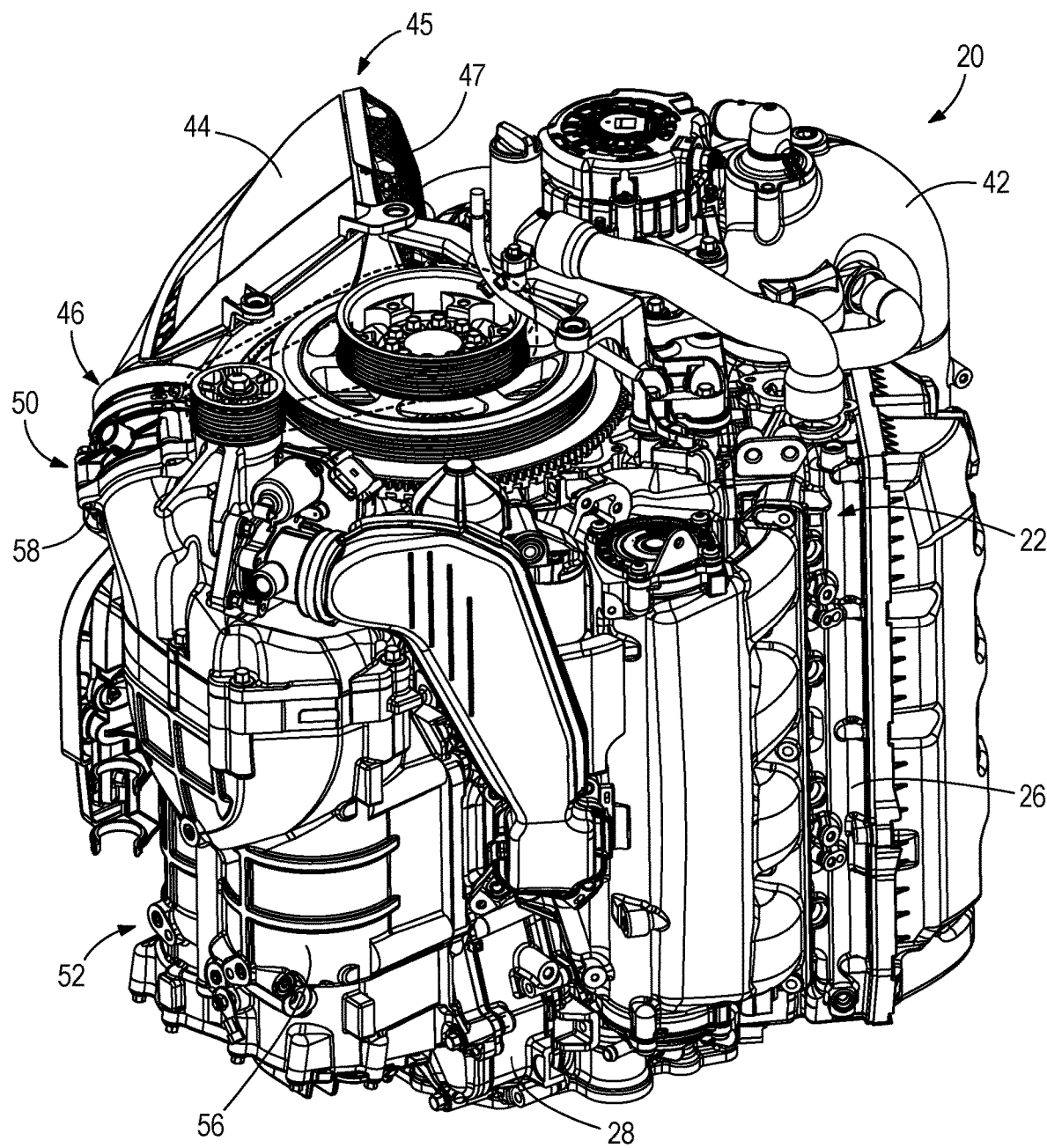
FIG. 2 is a port side front perspective view of the marine engine shown in FIG. 1.

Referring to FIGS. 1-5, the marine engine 20 receives intake air for combustion via an intake muffler 44 located along the starboard side of the marine engine 20. The intake muffler 44 is an elongated, inwardly curved body with an upstream inlet 45 and a downstream outlet 46. A filter or screen 47 is disposed on the upstream inlet 45 and is configured to filter particulate matter out of the incoming ambient air, which is received via an intake opening (not shown) on the aftward side of a cowling 48 (see FIG. 1) enclosing the marine engine 20. The cowling 48 is schematically shown in FIG. 1, and a suitable cowling having intake openings is shown in more detail in the above-incorporated U.S. Design Pat. No. D834,618. The interior of the intake muffler 44 is not shown in the drawings, but can include one or more expansion chambers and/or expansion passages for allowing expansion of the intake air and attenuation of sound generated by the intake air. The downstream outlet 46 is coupled to a throttle body 50 having a throttle valve for controlling flow of intake air to the powerhead 22, as is conventional. In certain examples, opening and closing of the throttle valve can be controlled by a computer controller, such as an engine control unit (ECU), as is conventional.

Through research and experimentation, the present inventors endeavored to provide a supercharged marine engine 20 for use in an outboard motor, in a relatively small-sized package. Conventionally, supercharged outboard motors have a discharge port for discharging charge air that is located on the side of the supercharger that is directed away from the engine block so as to avoid overheating of the supercharger and/or engine block. However the present inventors have realized that this outward-facing discharge port is not conducive to a small package size since the charge air ultimately needs to be conveyed to the cylinder heads. For example, the charge air leaving the supercharger must be ducted around a sealing flange, and around the perimeter of the supercharger, before it is ducted along the sides of the engine to a charge air cooler and then the cylinder head. As described in the present disclosure, the present inventors have invented a marine engine having a supercharger that discharges charge air towards the engine block and heads, thus advantageously providing a relatively smaller package size. Such an orientation for the charge air discharge is not convention and in fact counterintuitive. Various inventive concepts are presently disclosed that relate to this inventive concept and also that are separate and distinct from this concept.

Figure 11:
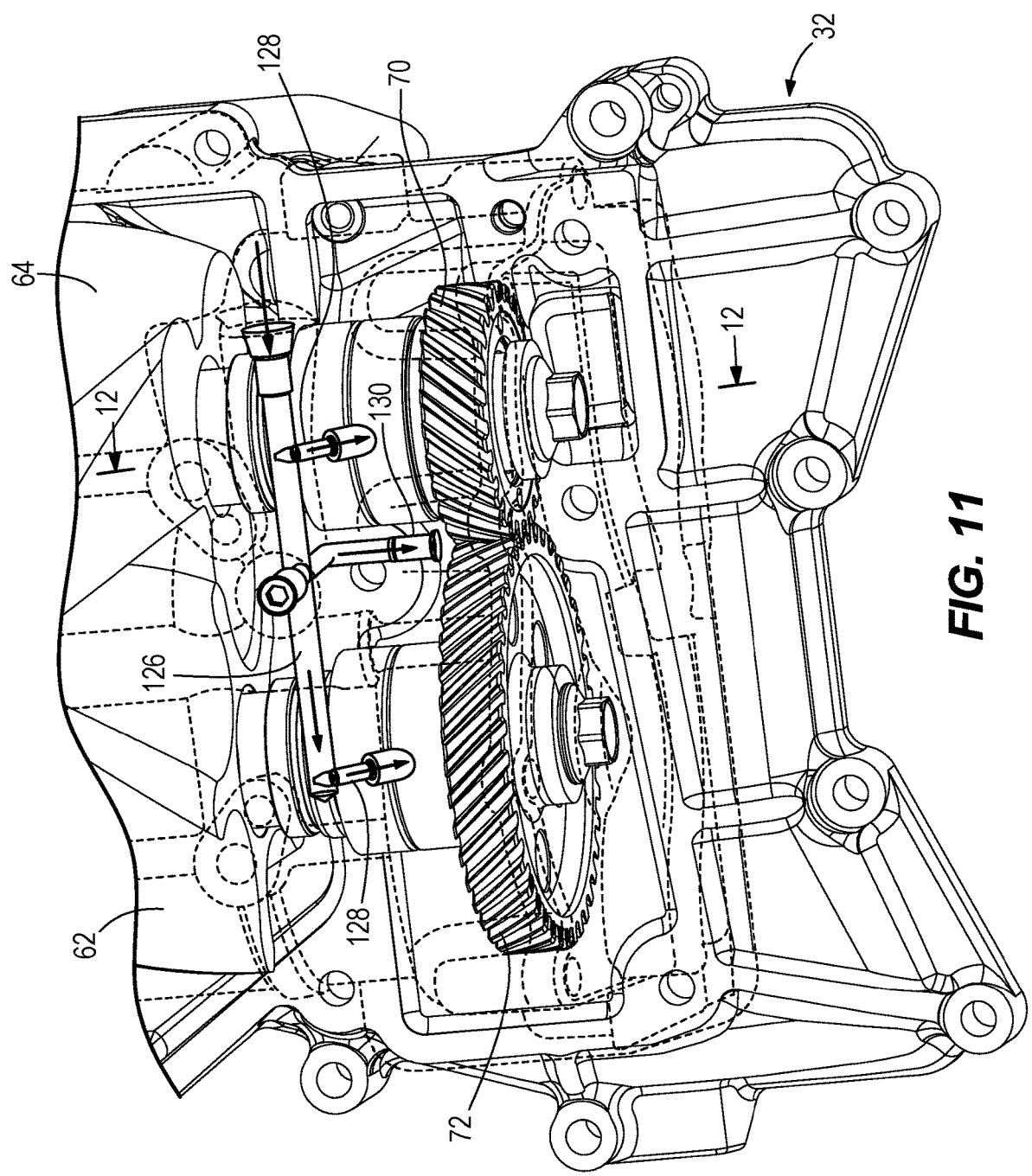
FIG. 11 is a view of a lubrication apparatus for the supercharger, showing portions of the supercharger in phantom line.

Referring to FIGS. 6-9, according to the present disclosure, the marine engine 20 includes a novel supercharger 52 mounted on an exterior mounting surface 54 of the crankcase cover 32, i.e., forwardly of the marine engine 20. The supercharger 52 and crankcase cover 32 are separate components that are mounted together by fasteners, as shown by dash-and-dot lines in FIG. 9. In other (not shown) examples, the supercharger 52 and crankcase cover 32 are formed together as a monolithic component. The supercharger 52 is configured to increase the pressure of the intake air in a conventional manner so as to provide pressurized intake air, which is known in the art as "charge air", for combustion in the marine engine 20. In particular, the supercharger 52 has a body 56 that is elongated with respect to the crankshaft axis 38 (see FIG. 12), an intake air inlet 58 (see FIG. 9) located on an upper starboard side of the body 56, and a centrally-located charge air outlet 61 (see FIGS. 8 and 9) for conveying higher-pressure charge air from the supercharger 52 for combustion in the powerhead 22. The configuration of the charge air outlet 61 is novel and is further described herein below. The supercharger 52 also includes a supercharger cavity 60 (see FIG. 6) containing first and second rotors 62, 64, that are adjacent to each other and elongated with respect to the crankshaft axis 38. Each rotor 62, 64 has a plurality of vanes configured such that rotation of the rotors 62, 64 compresses and thereby increases the pressure of the intake air received via the intake air inlet 58 and so as to discharge charge air via the noted charge air outlet 61, as will be further described herein below. Referring to FIGS. 11 and 12, the rotors 62, 64 each have a supporting shaft 66 which is supported for rotation relative to the body 56 of the supercharger 52 via bearings 68. Meshed gears 70, 72 (see FIG. 11) connect the rotors 62, 64 together such that the rotors 62, 64 rotate together. Meshed gears 70, 72 are located below the rotors 62, 64 and thus as further described herein below receive and are lubricated by the lubricant draining down the supercharger cavity 62. Referring to FIG. 3, a drive pulley 75 connected to the top of the crankshaft 30 causes rotation of a driven pulley 77 connected to the rotor 62, which is coupled to meshed gear 72 (see FIG. 11). Meshed gear 72 drives meshed gear 70, which is coupled to the rotor 64. Thus, the rotors 62, 64 rotate in a synchronization without touching each other. The manner in which the rotors 62, 64 are caused to rotate can vary from that which is shown and described.

Referring to FIGS. 6-9, the body 56 of the supercharger 52 has a forward side and an opposite, aftward side that is coupled to the exterior mounting surface 54 of the crankcase cover 32 via fasteners. The charge air outlet 61 is located on the aftward side of the supercharger 52 and is oriented so as to discharge charge air towards the powerhead 22, i.e., towards the crankshaft axis 38. This is most clearly shown in FIG. 6. The charge air outlet 61 is located generally between the rotors 62, 64 and the crankcase 28 and consists of a central duct that extends aftwardly, through both the body 56 of the supercharger 52 and through an outer portion of the crankcase cover 32. The charge air outlet 61 generally extends along an outlet axis 74 that intersects the crankshaft axis 38, as shown in FIG. 6.

Figure 8:
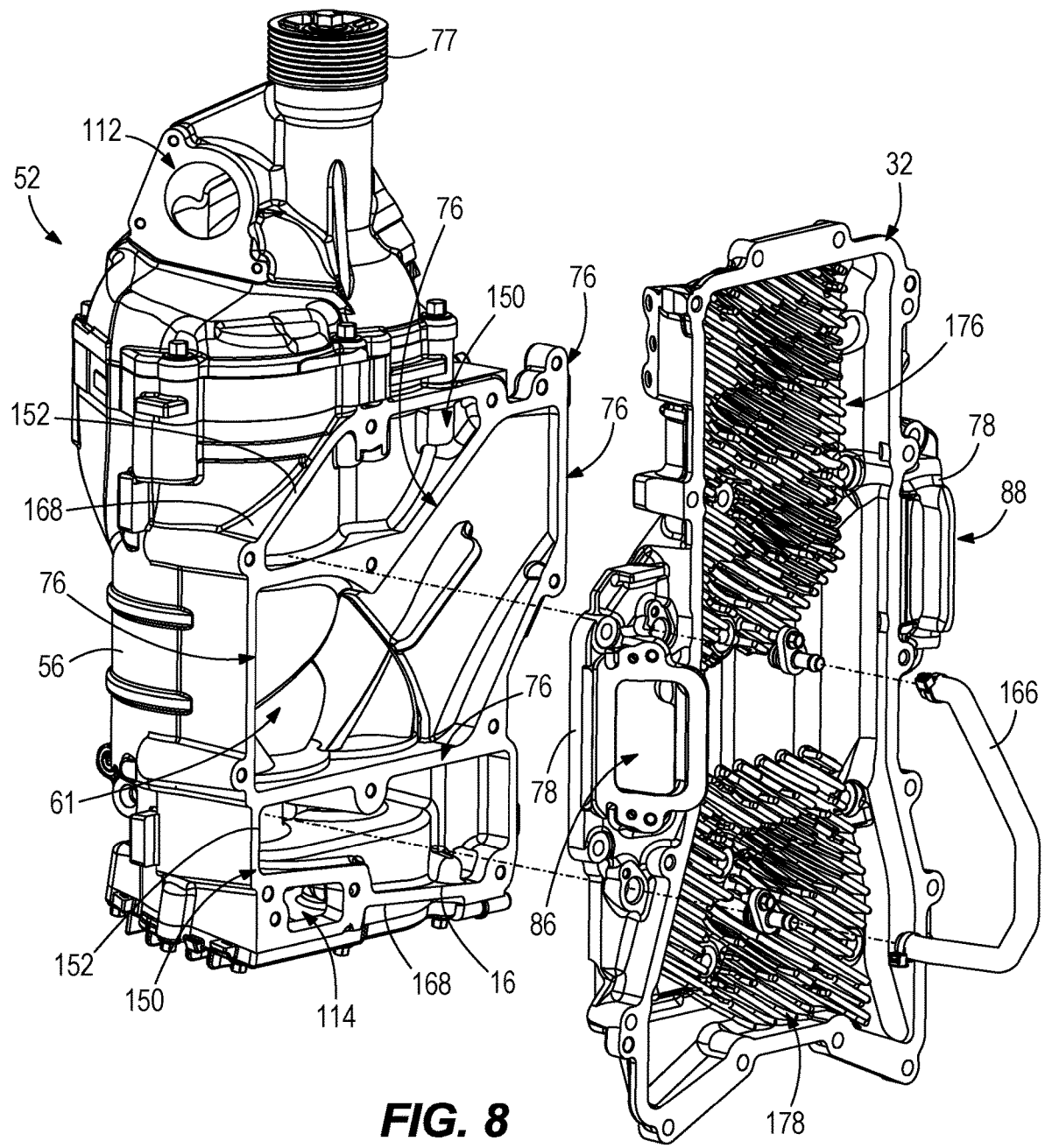
FIG. 8 is an exploded of the supercharger and crankcase cover shown in FIG. 7.
Figure 9:
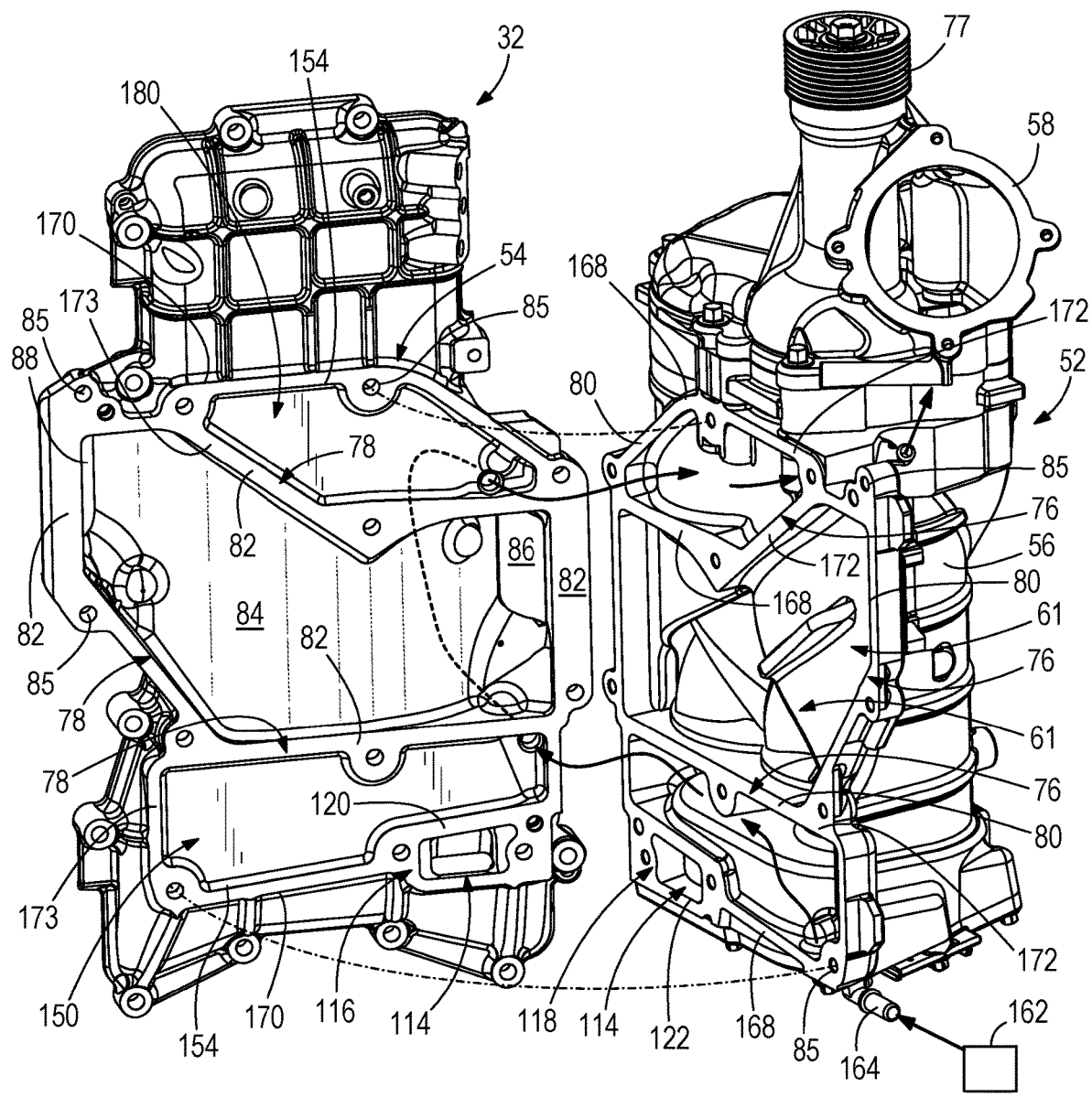
FIG. 9 is another exploded view of the supercharger and crankcase cover.

Referring to FIG. 8, the aftward side of the supercharger 52 has perimeter mounting flanges 76 that define a radially outer boundary of a portion of the central duct. Referring to FIG. 9, corresponding perimeter mounting flanges 78 are provided on the crankcase cover 32 and further define a radially outer boundary of another portion of the central duct. The perimeter mounting flanges 76, 78 have respective outer surfaces 80, 82 that face each other when the supercharger 52 is mounted to the crankcase cover 32, as shown via dash-and-dot lines in FIG. 9. Bolt holes 85 are provided on the perimeter mounting flanges 76, 78 for receiving fasteners that mount the supercharger 52 to the crankcase cover 32. Providing the central duct through both the supercharger 52 and the crankcase cover 32 allows a more direct route for charge air, compared to the prior art, and thus advantageously allows for a smaller overall package size.

Referring to FIG. 9, the exterior mounting surface 54 of the crankcase cover 32 has a rounded (e.g., crowned) outer deflection surface 84 that is located within the boundary defined by the perimeter mounting flange 78. The outer deflection surface 84 is configured to split and deflect flow of the charge air from the charge air outlet 61, which is an axial flow along outlet axis 74, towards port and starboard ducts 86, 88 (see FIG. 8) on port and starboard sides of the powerhead 22. Referring to FIG. 8, the port and starboard ducts 86, 88 are formed through opposite (port and starboard) sides of the crankcase cover 32, and particularly through sidewalls of the noted perimeter mounting flanges 78 and by sidewalls of the supercharger 76. Thus the outlet ducting for the charge air is partially formed in the crankcase cover 32 and partially formed in the supercharge 52, thereby advantageously negating a need for other space-consuming ducting and minimizing bolted joints.

Figure 10:
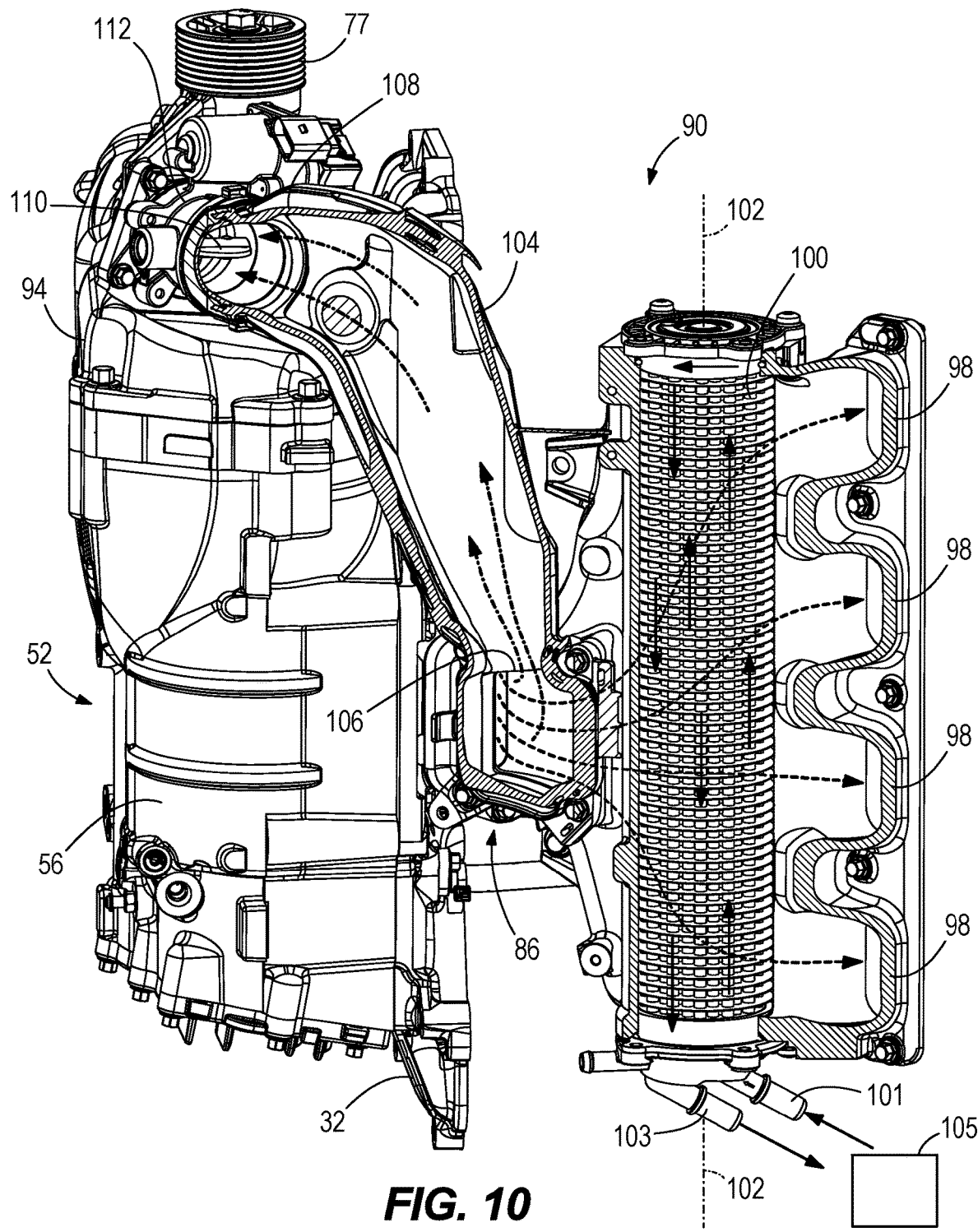
FIG. 10 is a view of Section 10-10, shown in FIG. 3, showing distribution of charge air to a port charge air cooler on the outboard marine engine, and recirculation of charge air to the supercharger.

Referring to FIGS. 6 and 10, the marine engine 20 further includes port and starboard charge air coolers 90, 92 located on opposite (port and starboard) sides of the powerhead 22. The port and starboard charge air coolers 90, 92 are configured to cool the charge air from the port and starboard ducts 86, 88, respectively, prior to discharge to the powerhead 22. Each of the port and starboard charge air coolers 90, 92 includes a body 94 that is elongated from top to bottom relative to the crankshaft axis 38. The body 94 has an upstream inlet 96 (see FIGS. 4 and 5) which is coupled via a floating, gasketed joint 97 on of the port and starboard ducts 86, 88 so that the upstream inlet 96 directly receives the charge air from the respective one of the port and starboard ducts 86, 88. The body 94 has a plurality of downstream outlets 98 that are vertically aligned and discharge the charge air to the respective cylinder head 26 and more particularly to respective vertically aligned cylinders of the engine block 24, for combustion therein. The upstream inlet 96 is generally centrally located with respect to the elongated body 94 and conveys the charge air across an air-to-water cooling apparatus in the respective charge air cooler 90, 92. Referring to FIG. 10, the port and starboard charge air coolers 90, 92 each has a plurality of cooling passages 100 that convey cooling water upwardly from a cooling water inlet 101 and back downwardly in the body 94 to a cooling water outlet 103, as shown by arrows. A cooling water pump 105 is configured to draw relatively cold cooling water from the body of water in which the outboard motor is operating and pump the cooling water through the cooling passages 100. The cooling passages 100 are spaced apart from each other and are located with respect to the upstream inlet 96 and downstream outlets 98 such that the charge air flows transversely through the spaces between the cooling passages 100, as shown by dashed arrows in FIG. 10. In other words, each of the port and starboard charge air coolers 90, 92 is elongated so that it extends along a charge air cooler axis 102 that is parallel to the crankshaft axis 38. The cooling passages 100 are configured to convey the cooling water in opposite directions (e.g. up and down) and parallel to the charge air cooler axis 102. The charge air is conveyed through the charge air cooler 90, 92, transversely to the charge air cooler axis 102 and across the cooling passages 100. Flow of the charge air through the spaces between the cooling passages 100 promotes an exchange of heat between the relatively warm charge air and the relatively cold cooling passages 100, thus cooling the charge air prior to distribution to the powerhead 22 for combustion.

Referring to FIG. 10, a recirculation passage 104 recirculates a flow of charge air from the port duct 86 back to the supercharger 52. In particular, the recirculation passage 104 has an inlet 106 connected to the starboard charge air cooler 90, downstream of the port duct 86. The recirculation passage 104 extends upwardly relative to the crankshaft axis 38 to an outlet 108 located near the top of the starboard side of the supercharger 52. A valve 110 is located at the outlet 108 and is configured to control recirculation flow of charge air back to the supercharger 52 via an inlet 112 (see FIG. 8) to which the outlet 108 is connected. The valve 110 is utilized to control the pressure of the charge air in both charge air coolers 90, 92. Opening the valve 110 allows pressurized charge air to be conveyed via passage 104 back to the low pressure inlet side of the supercharger 52, as indicated by dash-and-dot lines in FIG. 10. The valve 110 is controlled by an engine control unit associated with the marine engine 20 and is positioned into and between open, partially open and closed positions accordingly based on power demand of the marine engine, charge air temperature, and/or other parameters associated with the marine engine 20.

Figure 13:
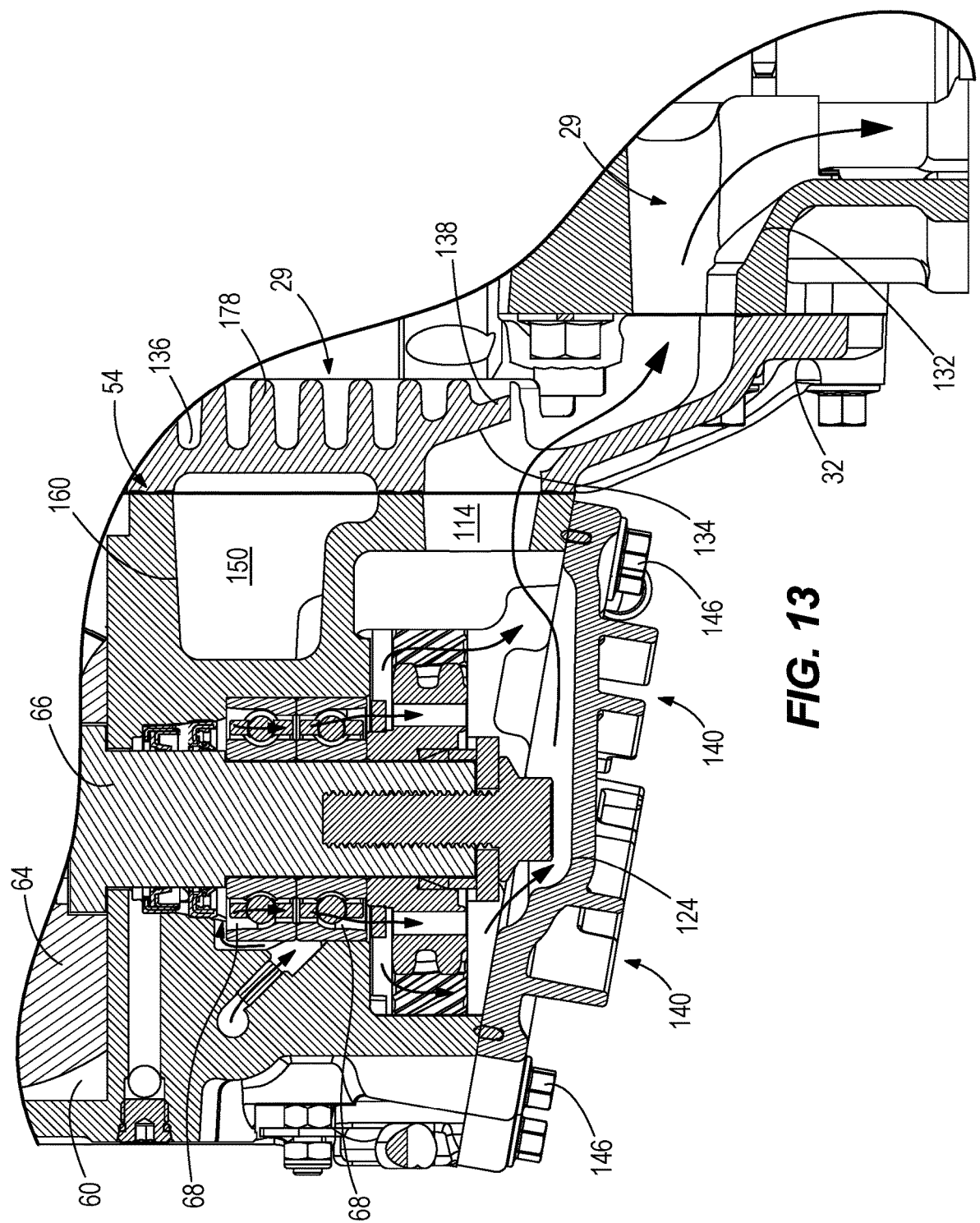
FIG. 13 is closer view of FIG. 12, showing flow of lubricant from the supercharger to the crankcase.

Referring now to FIGS. 11-13, the supercharger 52 is lubricated via lubricant (e.g., oil) from the powerhead 22. In the illustrated example, the lubricant is supplied to the supercharger 52 via a hose conduit from a lubricant gallery in the port cylinder head. The lubricant drains down the supercharger 52, as shown, and then back to the crankcase 28. Through research and experimentation, the present inventors have determined that the rate of lubricant draining out of the supercharger 52 can be negatively influenced by lubricant slinging off of the crankshaft 30 in the crankcase 28. The inventors found that if the lubricant does not properly drain from the supercharger 52 fast enough, the lubricant in the supercharger 52 heats up and can degrade. Also, the bearings 68 in the supercharger 52 and seals for the supercharger 52 can degrade. In certain instances this can also drive oil out of the supercharger vents, which is undesirable. According to the present disclosure, a novel drainage port 114 is provided, which is configured to efficiently and effectively drain lubricant from the supercharger 52 to the crankcase 28. The drainage port 114 is formed through the body 56 of the supercharger 52 and through the exterior mounting surface 54 of the crankcase cover 32. As shown in FIG. 9, the crankcase cover 32 has a perimeter mating flange 116 that defines a radially outer boundary of the drainage port 114. The supercharger 52 has a corresponding perimeter mating flange 118 that defines a radially outer boundary of the drainage port 114. The perimeter mating flange 116 and the perimeter mating flange 118 have corresponding outer surfaces 120, 122 that face each other when the supercharger 52 is mounted to the crankcase cover 32, as shown in FIGS. 12 and 13. The drainage port 114 is located below the lowermost connecting rod and crankshaft counterweight in the crankcase 32, See FIG. 12.

As described herein above, the supercharger cavity 60 contains the first and second rotors 62, 64 that are each supported by the noted upper and lower bearings 68 (upper bearings not shown). The supercharger cavity 60 is configured such that lubricant in the supercharger 52 drains by gravity downwardly onto the upper and lower bearings 68, to a sloped floor 124 of the supercharger cavity 60, and then to the drainage port 114. In particular, as shown by arrows in FIGS. 11 and 13, the lubricant is conveyed through a lateral gallery passage 126 and then is drained and/or sprayed via restricted (i.e., narrowed) branch passages 128 and/or nozzles 130 onto the bearings 68 and onto the gears 70, 72. The lubricant drains from these areas by gravity to the sloped floor 124 of the supercharger cavity 60 and then to the drainage port 114. The crankcase 28 also contains lubricant, as is conventional, which drains by gravity downwardly to a floor 132 of the crankcase cavity 29. The floor 124 of the supercharger cavity 60 is sloped towards the crankcase 28 so as to cause the lubricant to drain towards the drainage port 114. The floor of the crankcase cavity 29 is sloped generally towards the crankshaft axis 38 so as to cause the lubricant to drain away from the drainage port 114. Thus, the lubricant efficiently drains from the supercharger cavity 60, through the drainage port 114, and along the crankcase cavity 29 for conveyance to an (not shown) underlying conventional lubricant sump.

Referring to FIGS. 12 and 13, a lower deflection surface 134 is located in the crankcase 28, more particularly on the crankcase cover 32, adjacent to the drainage port 114. The lower deflection surface 134 transversely protrudes into the drainage port 114 and is configured to deflect lubricant from the drainage port (i.e. lubricant from the supercharger cavity 60 downwardly towards the floor 132 of the crankcase cavity 29 and noted sump. The lubricant in the crankcase cavity 29 drains down a forward internal surface 136 of the crankcase cover 32 and onto an upper deflection surface 138 located oppositely from the lower deflection surface 134. The upper deflection surface 138 deflects the lubricant aftwardly, causing it to merge with the lubricant that has already flowed through the drainage port 114 in an efficient manner, for further drainage together to the underlying sump. The lubricant is caused to efficiently drain back to the crankcase 28 at a location that is below the lowest conrod and counterweight of the crankshaft 30 (see FIG. 12). The lubricant drains through the drainage port 114, which has the louvered or shrouded opening, as described above. The special location and configuration (including shape) of the drainage port 114 prevents the lubricant coming off the crankshaft 30 from splashing into (or impinging onto) the flow of lubricant coming out of and creating a backpressure on the drainage port 114.

Referring to FIGS. 12 and 13, a plurality of retention features 140 are located on the exterior surface 142 of the floor 124 of the supercharger cavity 60. The retention features 140 include flanges 144 that are spaced apart from each other and configured to retain wires and/or hoses for the marine engine 20, in particular for precise placement of those wires and hoses during assembly of the marine engine 20. The configuration of these items advantageously prevents pinching of the wires and hoses during assembly and chafing of the wires and hoses during operation of the marine engine 20. In this example, the floor 124 of the supercharger cavity 60 is removably attached to the body 56 of the supercharger 52 by removable fasteners 146, which allows easy access for serviceability of the meshed gears 70, 72.

Figure 7:
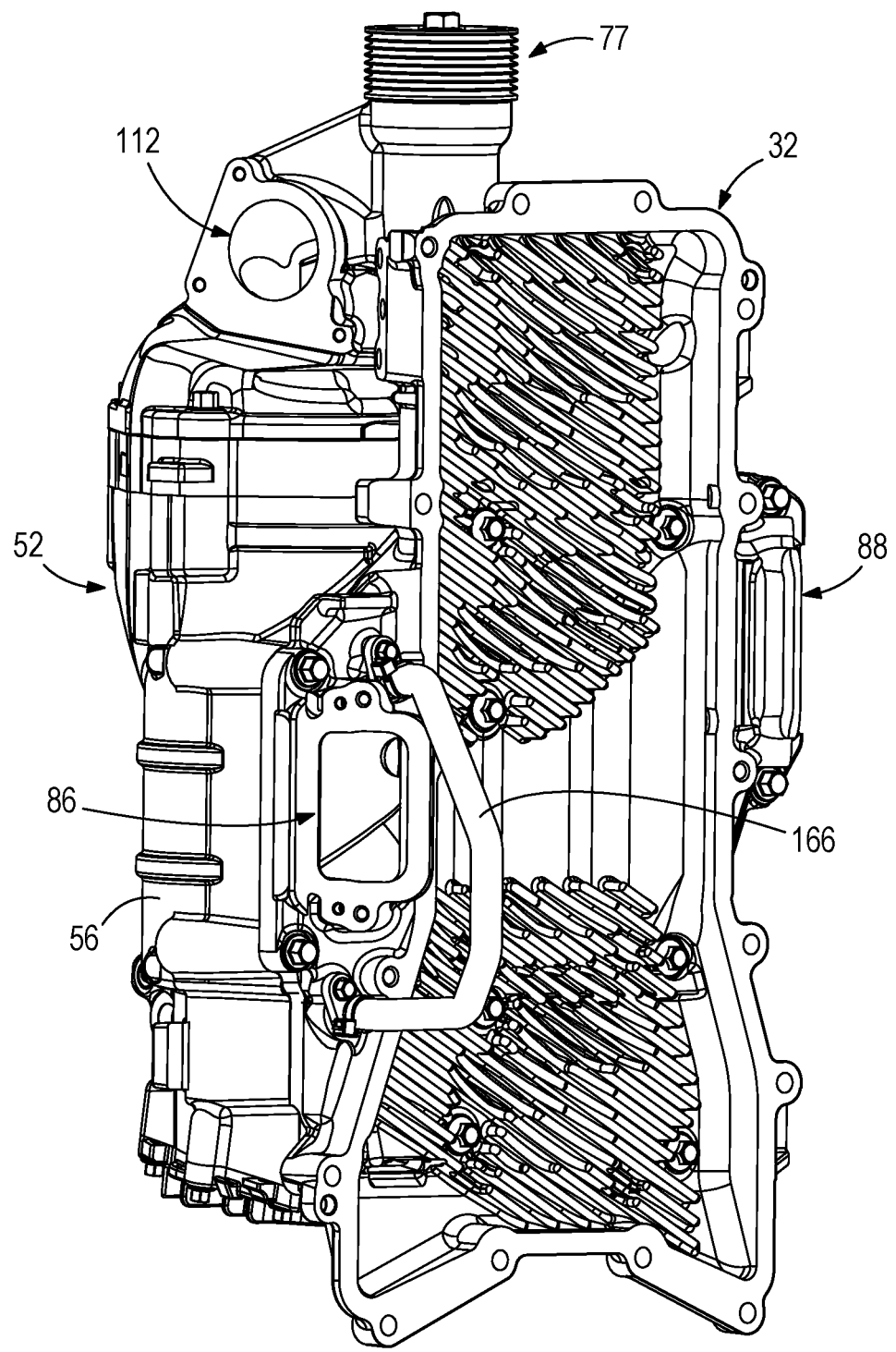
FIG. 7 is a view of a supercharger mounted on a crankcase cover of the outboard marine engine.

Through research and experimentation, the present inventors have also determined that both the lubricant slinging off the cranktrain in the crankcase 28 and the charge air discharged from the supercharger 52 are typically very hot, and it is preferable to keep these two heat sources insulated from each other. The present inventors have found it to be beneficial to keep both of these heat sources as cool as possible. However, to maintain a small package size of the marine engine and thus discharge charge air towards the crankcase 28, the present inventors found it to be challenging to properly insulate these two heat sources. Through research and experimentation, the inventors realized they could incorporate a cooling apparatus between the charge air outlet and the crankcase, and also add improved charge air coolers to thereby keep the charge air suitably cool, and add an oil cooler to keep the lubricant suitably cool. Referring to FIGS. 7-9, a novel cooling passage 150 conveys cooling fluid (e.g., water from the body of water in which the marine engine 20 is operated) between the crankcase cover 32 and the supercharger 52 so that the cooling fluid cools both the metal of the supercharger 62, crankcase cover 32, lubricant in the crankcase 28 and the lubricant in the supercharger 52. During research and experimentation, the present inventors have found that cooling of the supercharger 52 allows for smaller clearance space between the internal surfaces of the supercharger 52 and the rotors 62, 64, which increases efficiency. Compressing the air creates heat, so the supercharger 52 naturally gets hot, and as it does it becomes less efficient. Cooling the supercharger 52 thus increases efficiency. Cooling the supercharger 52 also provides secondary benefits including cooling of associated bearings, seals, lubricant, charge air, etc. The cooling passage 150 is defined by a cooling jacket having a first (forward) side 152 on the supercharger 52 (see FIG. 8) and an opposite, (aftward) second side 154 on the crankcase cover 32. The first and second sides 152, 154 are configured such that coupling the supercharger 52 to the crankcase cover 32 (as shown in dash-and-dot lines in FIG. 9) encloses the cooling passage 150.

The cooling passage 150 is advantageously located adjacent to the charge air outlet 61 and particularly on opposite sides of the noted central duct such that the cooling fluid cools the charge air as it is conveyed from the supercharger 52 towards the respective charge air coolers 90, 92. Referring to FIG. 12, the cooling passage 150 is defined by an axially upper cooling jacket 158 and an axially lower cooling jacket 160, which are spaced apart from each other. The axially upper and lower cooling jackets 158, 160 are on axially opposite sides of the charge air outlet 61 such that the charge air outlet 61 is located axially between the upper and lower cooling jackets 158, 160. A pump 162 (see FIG. 9) pumps cooling fluid into the cooling passage 150 from a body of water in which the marine engine 20 is operated. The pump 162 is connected to the lower cooling jacket 160 via an inlet port 164. A cooling line 166 (e.g., hose, see FIG. 8) conveys the cooling fluid from the lower cooling jacket 160 to the upper cooling jacket 158 when the marine engine 20 and/or pump 162 is operating. The cooling line 166 also drains cooling water from the upper cooling jacket 158 to the lower cooling jacket 160 when the marine engine 20 and/or pump 162 stop operating. In embodiments where the cooling fluid is water, all of the cooling water is advantageously drained back to the body of water in which the marine engine 20 is operating in a conventional manner. Referring to FIG. 9, perimeter mating flanges 168, 170 on the supercharger 52 and crankcase cover 32 surround the respective upper and lower cooling jacket 158, 160. Each of the perimeter mating flanges 168, 170 have outer surfaces 172, 173 that face each other when the supercharger 52 is mounted to the crankcase cover 32.

Referring to FIGS. 8 and 12, fins are located on the forward internal surface 136 of the crankcase cover 32, opposite the cooling passage 150. The fins are configured to facilitate heat exchange between the cooling fluid and the lubricant in the crankcase 28. In particular, FIG. 8 shows an axially upper plurality of fins 176 on the forward internal surface 136, opposite the axially upper cooling jacket 158. An axially opposite lower plurality of fins 178 is located on the forward internal surface 136, opposite the axially lower cooling jacket 160. Each of the first and second pluralities of fins 176, 178 are angled relative to the crankshaft axis 38, thereby facilitating drainage of the lubricant. During research and experimentation, the present inventors determined that it is advantageous to angle the pluralities of fins 176, 178 relative to the crankshaft 30. Doing so was found to facilitate better drainage of lubricant, which is flung off of the crankshaft 30 at a similar angle. The angled pluralities of fins 176, 178 were found to facilitate improved drainage compared to straight vertical or straight horizontal fins. The upper and lower pluralities of fins 176, 178 thus facilitate heat exchange between the cooling fluid and the lubricant in the crankcase 28. As shown in FIG. 12, the lower plurality of fins 176 is adjacent and smoothly transitions to the lower deflection surface 138, thus promoting drainage of the lubricant within the crankcase cavity 29. The area of the crankcase cover 32 located along the central duct for charge air (i.e. along the outer deflection surface 84) is devoid of cooling fins to minimize heat transfer in either direction.

As shown in FIG. 12, the cooling passage 150, and particularly as defined by the lower cooling jacket 160, is located adjacent to and in particular immediately above portions of the drainage port 114, thus facilitating heat exchange between the relatively cold cooling fluid and relatively hot lubricant. The cooling passage 150, and particularly as defined by the lower cooling jacket 160, is located between the central duct for conveying charge air from the supercharger 52 and the lubricant drainage surfaces in the supercharger 52 and crankcase cover 32, thus facilitating heat exchange between the relatively cold cooling fluid and relatively hot lubricant. As shown in FIGS. 8 and 9, a lower portion of the radially outer boundary of the lower cooling jacket 160 is located adjacent to and particularly immediately above an upper portion of the radially outer boundary of the drainage port 114.

The cooling passage 150 is thus advantageously configured to cool both the crankcase 30, including the crankcase cover 32, and the supercharger 52, including its housing, bearings, seals, and lubricant and charge air therein.

The crankcase cover 32 thus is configured to perform several advantageous functions, including: (A) containing lubricant splashing off the cranktrain, (B) supporting the supercharger, (C) forming part of the outlet duct of the supercharger, (D) splitting the flow of charge air into two branches, namely port and starboard branches, (E) forming part of the oil cavity of the supercharger gears and providing a path back to the crankcase for drainage of lubricant and (F) forming part of the water jackets for cooling fluid to enable cooling of the lubricant in the crankcase and the supercharger housing (particularly around the discharge outlet), and the outlet air of the supercharger.

The charge air coolers 90, 92 thus are configured to perform several advantageous functions, including: (A) supporting an air-to-water heat exchanger for cooling the charge air, (B) allowing for attachment of a bypass duct, (C) incorporating a manifold downstream of the heat exchanger to distribute air to multiple intake ports in the cylinder heads, (D) each charge air cooler sharing a same casting for efficient manufacturing, and (E) having inlet seals to a respective port or starboard discharge port on the crankcase cover. The supercharger 52 is advantageously configured to (A) compress charge air, (B) contain and drain lubricant, (C) forms part of the outlet duct and associates branches, (D) form part of the noted water jackets, (E) and accept direct mounting of the bypass valve.

The present disclosure thus provides a novel marine engine and supercharger combination that provides an efficient use of components and space. However in particular, it should be noted that while the application discloses embodiments wherein the cooling passage 150 is implemented in conjunction with the aftwardly facing central duct for charge air, in other embodiments the cooling passage 150 can be implemented with a supercharger having a forwardly facing duct for charge air.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A marine engine comprising a powerhead having an engine block, a cylinder head and a crankcase containing a crankshaft, wherein operation of the marine engine causes rotation of the crankshaft; a crankcase cover enclosing the crankshaft in the crankcase; and a supercharger on the crankcase cover, the supercharger being configured to provide charge air for combustion in the powerhead, wherein the supercharger comprises a charge air outlet for conveying charge air from the supercharger for combustion in the powerhead, the charge air outlet being oriented so as to discharge the charge air towards the powerhead, wherein the charge air outlet comprises a central duct extending along the outlet axis, the central duct discharging charge air to port and starboard ducts on port and starboard sides of the powerhead, and wherein the port and starboard ducts are formed through opposite sides of the crankcase cover.

2. A marine engine comprising a powerhead having an engine block, a cylinder head and a crankcase containing a crankshaft, wherein operation of the marine engine causes rotation of the crankshaft; a crankcase cover enclosing the crankshaft in the crankcase; and a supercharger on the crankcase cover, the supercharger being configured to provide charge air for combustion in the powerhead, wherein the supercharger comprises a charge air outlet for conveying charge air from the supercharger for combustion in the powerhead, the charge air outlet being oriented so as to discharge the charge air towards the powerhead, and wherein the charge air outlet comprises a central duct extending along the outlet axis, the central duct discharging charge air to port and starboard ducts on port and starboard sides of the powerhead; and further comprising perimeter mating flanges on the crankcase cover and supercharger that define radially outer boundaries of the central duct and having outer surfaces that face each other when the supercharger is mounted to the crankcase cover.

3. The marine engine according to claim 2, wherein the crankcase cover comprises an outer deflection surface that faces the supercharger, the outer deflection surface being rounded so as to deflect flow of the charge air to opposite sides of the powerhead and through both of the port and starboard ducts.

4. A marine engine comprising a powerhead having an engine block, a cylinder head and a crankcase containing a crankshaft, wherein operation of the marine engine causes rotation of the crankshaft; a crankcase cover enclosing the crankshaft in the crankcase; and a supercharger on the crankcase cover, the supercharger being configured to provide charge air for combustion in the powerhead, wherein the supercharger comprises a charge air outlet for conveying charge air from the supercharger for combustion in the powerhead, the charge air outlet being oriented so as to discharge the charge air towards the powerhead, and wherein the charge air outlet comprises a central duct extending along the outlet axis, the central duct discharging charge air to port and starboard ducts on port and starboard sides of the powerhead; and further comprising port and starboard charge air coolers cooling the charge air from the port and starboard ducts, respectively.

5. The marine engine according to claim 4, wherein the crankshaft extends along a crankshaft axis and wherein the charge air outlet is oriented towards the crankshaft axis.

6. The marine engine according to claim 4, wherein the crankshaft extends along a crankshaft axis, and wherein the charge air outlet comprises a central duct extending along an outlet axis that intersects the crankshaft axis.

7. The marine engine according to claim 4, wherein the supercharger comprises at least one elongated rotor that extends parallel to the crankshaft, and wherein the charge air outlet is located between the elongated rotor and the crankcase.

8. The marine engine according to claim 4, wherein the charge air outlet comprises a central duct extending along the outlet axis, the central duct discharging charge air to port and starboard ducts on port and starboard sides of the powerhead.

9. The marine engine according to claim 4, wherein each port and starboard charge air coolers comprises an upstream inlet receiving the charge air and a plurality of downstream outlets discharging the charge air for combustion in the powerhead.

10. The marine engine according to claim 9, wherein each of the port and starboard charge air coolers comprises a cooling passage that conveys cooling water adjacent to the charge air such that the charge air is cooled by the cooling water.

11. The marine engine according to claim 10, wherein each of the port and starboard charge air coolers extends along a charge air cooler axis that is parallel to the crankshaft axis, wherein the cooling passage conveys the cooling water in opposite directions and parallel to the charge air cooler axis, and wherein the charge air cooler conveys the charge air transversely to the charge air cooler axis.

12. A marine engine comprising a powerhead having an engine block, a cylinder head and a crankcase containing a crankshaft, wherein operation of the marine engine causes rotation of the crankshaft; a crankcase cover enclosing the crankshaft in the crankcase; and a supercharger on the crankcase cover, the supercharger being configured to provide charge air for combustion in the powerhead, wherein the supercharger comprises a charge air outlet for conveying charge air from the supercharger for combustion in the powerhead, the charge air outlet being oriented so as to discharge the charge air towards the powerhead, and wherein the charge air outlet comprises a central duct extending along the outlet axis, the central duct discharging charge air to port and starboard ducts on port and starboard sides of the powerhead, and further comprising a recirculation passage that conveys a flow of charge air from one of the port and starboard ducts back to the supercharger.

13. The marine engine according to claim 12, further comprising a valve that controls the flow of charge air back to the supercharger.

14. The marine engine according to claim 4, further comprising a muffler that conveys intake air to the supercharger.

15. The marine engine according to claim 14, further comprising a throttle that controls flow of the intake air from the muffler to the supercharger.

16. The marine engine according to claim 4, further comprising a cooling passage that conveys cooling fluid between the crankcase cover and the supercharger so that the cooling fluid cools both lubricant in the crankcase and lubricant in the supercharger.

17. A marine engine comprising a powerhead having an engine block, a cylinder head and a crankcase containing a crankshaft, wherein operation of the marine engine causes rotation of the crankshaft; a crankcase cover enclosing the crankshaft in the crankcase; and a supercharger on the crankcase cover, the supercharger being configured to provide charge air for combustion in the powerhead, wherein the supercharger comprises a charge air outlet for conveying charge air from the supercharger for combustion in the powerhead, the charge air outlet being oriented so as to discharge the charge air towards the powerhead; and further comprising a cooling passage that conveys cooling fluid between the crankcase cover and the supercharger so that the cooling fluid cools both lubricant in the crankcase and lubricant in the supercharger, wherein the cooling passage is defined by a cooling jacket having a first side on the supercharger and on an opposite second side on the crankcase cover and such that coupling the supercharger to the crankcase cover encloses the cooling passage.

18. The marine engine according to claim 17, wherein the cooling passage is located adjacent to a charge air outlet from the supercharger such that the cooling fluid cools the charge air as the charge air is conveyed to the powerhead.

19. The marine engine according to claim 18, wherein the charge air outlet comprises a central duct directing charge air towards the crankcase cover and port and starboard ducts directing the charge air from the central duct to port and starboard sides of the powerhead; and wherein the port and starboard ducts convey charge air to port and starboard charge air coolers, respectively, for cooling the charge air prior to conveyance to the powerhead.

* * * * *